(12) United States Patent
Kim (10) Patent No.: US 9,203,839 B2
(45) Date of Patent: Dec. 1, 2015

(54) USER AUTHENTICATION METHOD AND APPARATUS

(71) Applicant: Foundation of Soongsil University-Industry Cooperation, Seoul (KR)

(72) Inventor: Ik Su Kim, Gyeonggi-Do (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/493,926

(22) Filed: Sep. 23, 2014

(65) Prior Publication Data

US 2015/0089228 A1    Mar. 26, 2015

(30) Foreign Application Priority Data

Sep. 23, 2013   (KR) .................. 10-2013-0112531

(51) Int. Cl.
  *H04L 29/06* (2006.01)
  *H04L 9/32* (2006.01)

(52) U.S. Cl.
  CPC .......... *H04L 63/0876* (2013.01); *H04L 9/3228* (2013.01); *H04L 9/3242* (2013.01)

(58) Field of Classification Search
  CPC .. H04L 63/0876; H04L 9/3228; H04L 9/3242
  See application file for complete search history.

(56) References Cited

U.S. PATENT DOCUMENTS

| | | | | |
|---|---|---|---|---|
| 7,926,095 B1* | 4/2011 | Weiner | ................. | H04L 9/0891 713/168 |
| 8,412,928 B1* | 4/2013 | Bowness | ............. | H04L 63/0838 713/155 |
| 8,510,556 B2* | 8/2013 | Cao | ........................ | H04L 9/0844 713/169 |
| 2005/0166058 A1* | 7/2005 | Brokenshire | ......... | H04L 9/0662 713/181 |
| 2005/0198170 A1* | 9/2005 | LeMay | .................. | H04L 12/58 709/206 |
| 2007/0220597 A1* | 9/2007 | Ishida | .................... | G06Q 20/12 726/8 |
| 2010/0262834 A1* | 10/2010 | Freeman | ................. | G06F 21/31 713/184 |
| 2012/0166801 A1* | 6/2012 | Park | ....................... | H04L 9/3228 713/169 |

* cited by examiner

*Primary Examiner* — Chau Le (74) *Attorney, Agent, or Firm* — Mintz Levin Cohn Ferris Glovsky and Popeo, P.C.; Kongsik Kim (57) ABSTRACT

A user authentication method and apparatus are disclosed. One embodiment of the invention can provide a method for authenticating a user from a server that includes: (a) transmitting a one-time server certification message in response to an authentication request including a user ID of a client terminal, and receiving a one-time terminal certification message from the client terminal; and (b) authenticating the user by verifying the one-time terminal certification message by using a hash value stored beforehand in correspondence to the user ID.

12 Claims, 5 Drawing Sheets

USER AUTHENTICATION METHOD AND APPARATUS

CROSS-REFERENCE TO RELATED APPLICATIONS

This application claims the benefit of Korean Patent Application No. 10-2013-0112531, filed with the Korean Intellectual Property Office on Sep. 23, 2013, the disclosure of which is incorporated herein by reference in its entirety.

BACKGROUND

1. Technical Field

The present invention relates to user authentication, more particularly to a user authentication method and system that can provide authentication by having a client terminal and a server verify each other through a one-time credential certification transferred between the client terminal and the server.

2. Description of the Related Art

The current web browser from Microsoft provides the SmartScreen filter that is capable of detecting phishing servers. This may involve the web browser comparing a particular server, which the user is accessing, with a list of previously reported phishing servers to search and check whether the server that the user is currently accessing is on the list.

This SmartScreen filter thus detects phishing servers that were previously registered and can therefore reduce cases of users falling victim to phishing scams. However, recent times have seen a rapid increase in phishing servers, and it can be very difficult to manage the phishing server list.

Moreover, the SmartScreen filter has the critical drawback of being unable to detect phishing if the URL of a new phishing server is not registered on the list of phishing servers. Also, since the phishing server list has to be searched every time the user accesses a server, it can take a long time to load the main page of a server, even when the user accesses a legitimate server. Because of these drawbacks, users may hesitate to use the SmartScreen filter.

SUMMARY

An aspect of the invention is to provide a user authentication method and apparatus that can provide authentication by having a client terminal and a server verify each other through a one-time credential certification transferred between the client terminal and the server.

Also, an aspect of the invention is to provide a user authentication method and apparatus that can prevent the breach of personal information against phishing or pharming attacks by authenticating a user without transferring a password for user authentication to a server.

Also, an aspect of the invention is to provide a user authentication method and apparatus that uses one-time credential certification between the client terminal and the server, to be safe against replay attacks and man-in-the-middle attacks.

Also, an aspect of the invention is to provide a user authentication method and apparatus that does not use an encryption key such as a private key and a public key and hence enables a very high speed for the authentication.

An aspect of the invention provides a user authentication method that can provide authentication by having a client terminal and a server verify each other through a one-time credential certification transferred between the client terminal and the server.

One embodiment of the invention can provide a method for authenticating a user from a server that includes: (a) transmitting a one-time server certification message in response to an authentication request including a user ID of a client terminal, and receiving a one-time terminal certification message from the client terminal; and (b) authenticating the user by verifying the one-time terminal certification message by using a hash value stored beforehand in correspondence to the user ID.

The hash value can be a resultant value of applying a password and a domain name to a unidirectional hash function and can be registered together with the user ID from the client terminal at the time of registering an account.

The one-time terminal certification message can include a resultant value of applying an exclusive disjunction operation to a second-order hash value and the hash value, and the second-order hash value can be obtained by applying a hash function to at least one of the hash value, IP information of the client terminal, and a random value.

The random value can be extracted from the one-time server certification message and can be randomly generated with every authentication.

The authenticating of the user in step (b) can include: calculating a second-order hash value by applying a unidirectional hash function to at least one of the random value, the hash value, and IP information included in a packet header of the one-time terminal certification message; deriving the resultant value of applying an exclusive disjunction operation to the calculated second-order hash value and the hash value; and authenticating the user by determining whether or not the derived resultant value and a resultant value included in the one-time terminal certification message are identical.

The transmitting of the one-time server certification message in step (a) can include: generating a random value; calculating a verification seed value by applying an exclusive disjunction operation to the hash value and the random value; calculating a second-order hash value by applying a unidirectional hash function to at least one of the hash value, the random value, and IP information; calculating a resultant value of applying an exclusive disjunction operation to the second-order hash value and the hash value; generating the one-time server certification message including the resultant value and the verification seed value; and transmitting the generated one-time server certification message to the client terminal.

The user authentication method can further include storing the user ID and the hash value in correspondence to each other in response to an account registration request of the client terminal, prior to step (a).

Another embodiment of the invention can provide a user authentication request method for a client terminal requesting user authentication from a server, where the method includes: transmitting a user ID to the server; receiving a one-time server certification message from the server in response to transmitting the user ID; and generating a one-time terminal certification message for user authentication, if a verification of the server is successful, and transmitting the one-time terminal certification message to the server, the verification of the server performed by verifying the one-time server certification message by using a hash value using a password.

The hash value may be a resultant value of applying a password and a domain name to a unidirectional hash function.

The one-time server certification message can include a verification seed value and a resultant value of applying an exclusive disjunction operation to a second-order hash value and the hash value, where the second-order hash value can be obtained by applying a hash function to at least one of the hash value, IP information of the server, and the random value.

The verifying of the one-time server certification message can include: extracting the verification seed value; extracting the random value by performing an exclusive disjunction operation on the hash value and the verification seed value; calculating a second-order hash value by applying a unidirectional hash function to the random value, IP information included in a packet header of the one-time server certification message, and the hash value, and performing an exclusive disjunction operation on the second-order hash value and the hash value to calculate a resultant value; and verifying the server according to whether or not the resultant value and a resultant value included in the one-time server certification message are identical.

The generating of the one-time terminal certification message can include: generating a second-order hash value by applying a unidirectional hash function to at least one of the random value, the hash value, and IP information of the client terminal; calculating a resultant value of performing an exclusive disjunction operation on the second-order hash value and the hash value; and generating the one-time terminal certification message including the resultant value.

Another aspect of the invention provides an apparatus that can provide authentication by having a client terminal and a server verify each other through a one-time credential certification transferred between the client terminal and the server.

An embodiment of the invention can provide a server that includes: a communication unit configured to transmit a one-time server certification message in response to an authentication request including a user ID of a client terminal and configured to receive a one-time terminal certification message from the client terminal in reply to the transmission; and an authentication unit configured to authenticate a user by verifying the one-time terminal certification message by using a hash value stored beforehand in correspondence to the user ID.

Another embodiment of the invention can provide a client terminal that includes: a communication unit configured to receive a one-time server certification message in response to transmitting a user ID; a server verification unit configured to verify a server by verifying the one-time server certification message by using a hash value using a password; and an authentication request unit configured to generate a one-time terminal certification message for user authentication, if a verification of the server is successful, and to transmit the one-time terminal certification message to the server.

A user authentication method and apparatus according to an embodiment of the invention can provide authentication by having a client terminal and a server verify each other through a one-time credential certification transferred between the client terminal and the server, to thereby provide the advantage of preventing breaches of personal information against phishing or pharming attacks as there is no password for user authentication transferred to the server.

An embodiment of the invention may also use one-time credential certification between the client terminal and the server, to be safe against replay attacks and man-in-the-middle attacks.

Also, since the invention does not use an encryption key such as a private key and a public key, a very high speed for the authentication can be implemented.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the written description, certain detailed explanations of related art are omitted when it is deemed that they may unnecessarily obscure the essence of the present invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention relates to a user authentication method and system that can perform authentication by a mutual verification between a client terminal and a server by the exchange of one-time credential certification, without transmitting the user's password to authenticate the client terminal.

Since the user's password is not transmitted to the server, it is possible to prevent the information for user authentication from being leaked outside even in the event of attacks such as phishing or pharming. Certain embodiments of the invention are described below in more detail with reference to the accompanying drawings.

Figure 1:
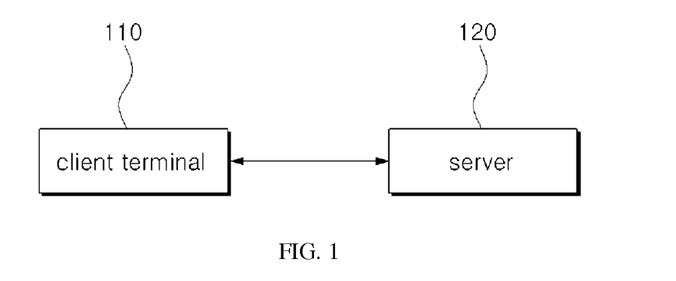
FIG. 1 is a block diagram illustrating the composition of a system for authenticating a user according to an embodiment of the invention.

FIG. 1 is a block diagram illustrating the composition of a system for authenticating a user according to an embodiment of the invention.

Referring to FIG. 1, a system for user authentication according to an embodiment of the invention may include a client terminal 110 and a server 120.

The client terminal 110 may be a device for connecting to the server 120 and receiving the various services provided by the server 120. The client terminal 110 may go through an authentication procedure with the server 120 to receive the services provided by the server 120.

To perform the authentication procedure with the server 120, the client terminal 110 may first transmit user identification information (e.g. a user ID) to the server 120, and may receive a one-time server certification message from the server 120. Then, the client terminal 110 may use a preset password to verify the one-time server certification message, and if the verification is successful, may generate a one-time terminal certification message for certifying the client terminal 110 and transmit the one-time terminal certification message to the server 120.

The one-time server certification message and the one-time terminal certification message transmitted and received between the client terminal 110 and the server 120 may each include a hash value that uses a password and a domain name.

Figure 2:
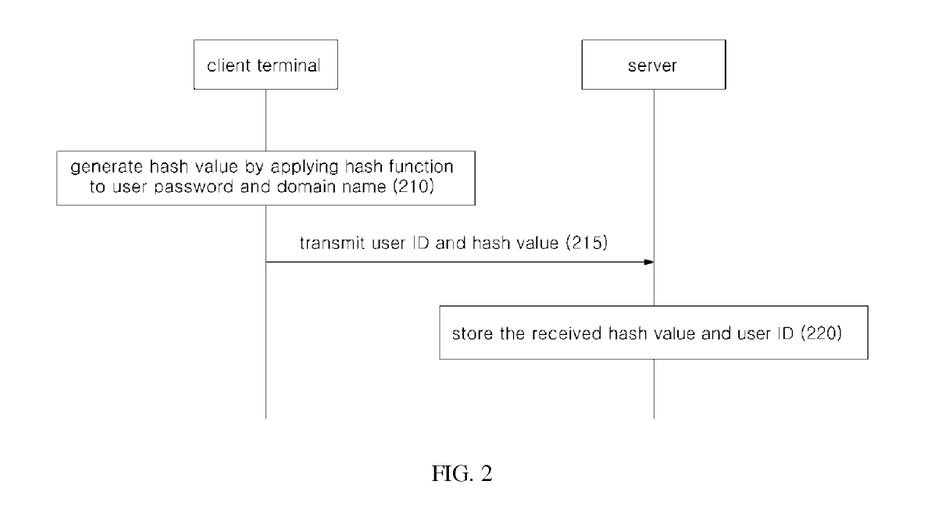
FIG. 2 is a flow diagram illustrating a method of registering a user account to a server from a client terminal according to an embodiment of the invention.

FIG. 2 is a flow diagram illustrating a method of registering a user account to a server from a client terminal according to an embodiment of the invention.

In step 210, the client terminal 110 may generate a hash value by applying a unidirectional hash function to the user password and the domain name.

More specifically, suppose that a user runs a web browser from on the client terminal 110, decides on a user account and provides input. The executed web browser can generate a hash value by applying a unidirectional hash function to the domain name of the server 120 and the inputted password.

In step 215, the client terminal 110 may transmit the hash value thus generated and the user ID inputted by the user to the server 120. More specifically, the web browser executed from on the client terminal 110 can transmit the hash value and the user ID to the server 120 to register a user account.

Then, in step 220, the server 120 may store the hash value and user ID received from the client terminal 110. The server 120 can store the received user ID and hash value as a corresponding match.

Thus, according to an embodiment of the invention, registering a user account may transmit the hash value obtained by applying a unidirectional hash function without directly exposing the user's password, thereby preventing the password of the user account from being exposed even in the event of a pharming or phishing attack.

Figure 3:
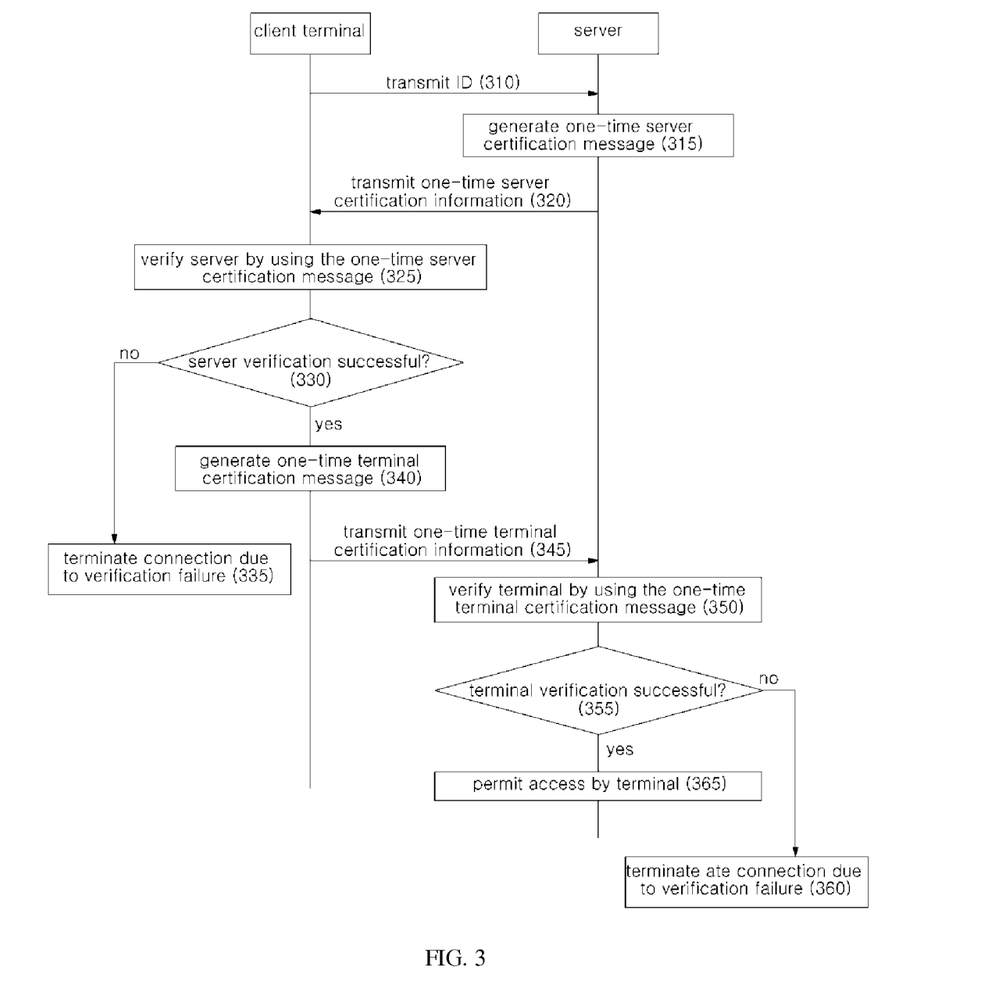
FIG. 3 is a flow diagram illustrating a user authentication method according to an embodiment of the invention.
Figure 4:
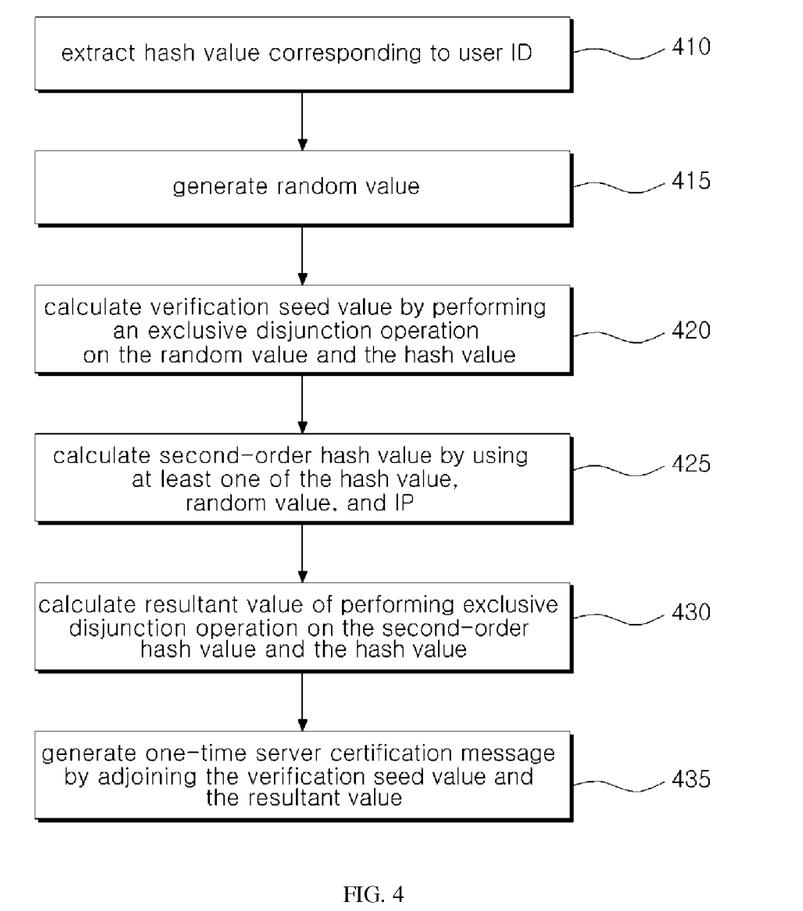
FIG. 4 is a flowchart illustrating a process of generating a one-time server certification message at a server according to an embodiment of the invention.
Figure 5:
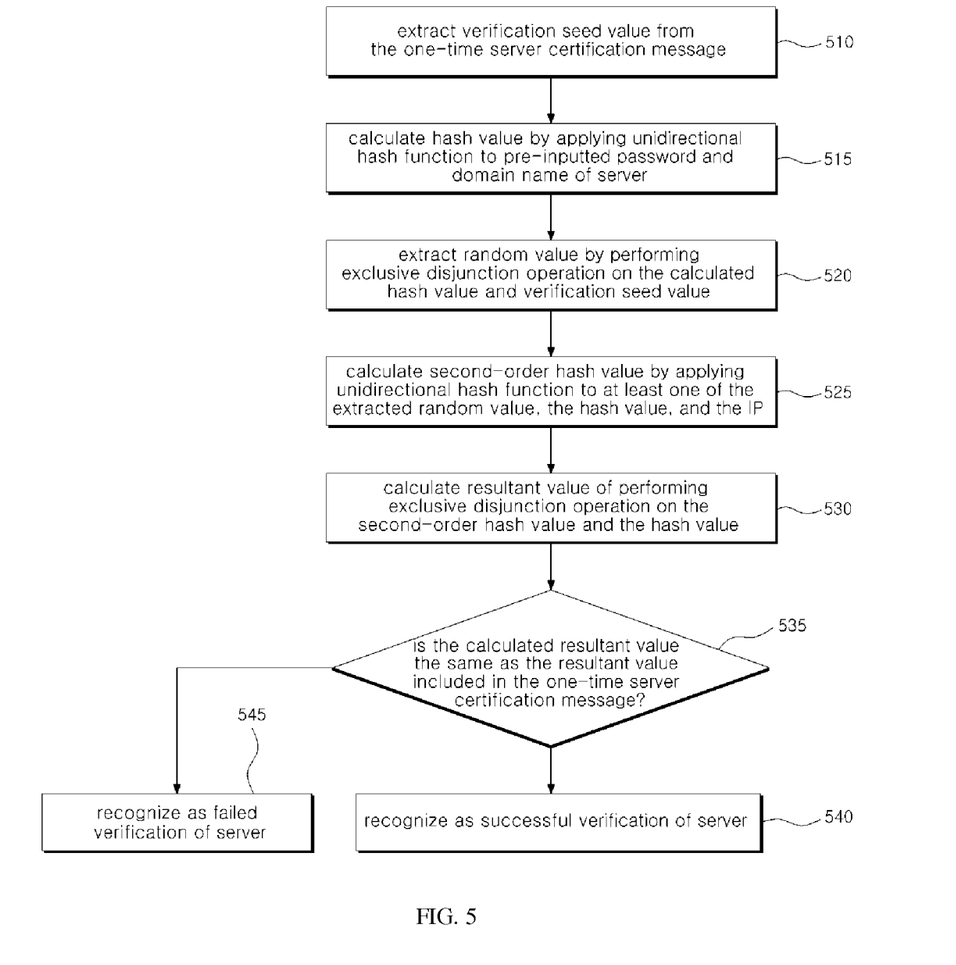
FIG. 5 is a flowchart illustrating a process of verifying a server from a client terminal according to an embodiment of the invention.

FIG. 3 is a flow diagram illustrating a user authentication method according to an embodiment of the invention, FIG. 4 is a flowchart illustrating a process of generating a one-time server certification message at a server according to an embodiment of the invention, and FIG. 5 is a flowchart illustrating a process of verifying a server from a client terminal according to an embodiment of the invention.

In step 310, the client terminal 110 may transmit a user ID, needed for user authentication, to the server 120 in order to receive the various services provided by the server 120.

More specifically, in the descriptions that follow, it will be assumed that the client terminal 110 has a web browser installed thereon and that the web browser is running to enable the use of a service provided by the server 120. That is, even if each step for the client terminal 110 referred to below is described as being performed by the client terminal 110, it should be interpreted as being performed with the web browser running on the client terminal 110.

In step 315, the server 120 may generate a one-time server certification message by using the hash value that was stored in correspondence to the user ID received from the client terminal 110.

The method of generating the one-time server certification message at the server 120 is considered below in more detail with reference to FIG. 4.

In step 410, the server 120 may extract the hash value corresponding to the user ID received from the client terminal 110.

As described above with reference to FIG. 2, the server 120 may store a hash value (i.e. obtained by hashing a password and a domain name) together with a user ID for each user who has a user account registered.

Accordingly, if the user ID is already registered, the server 120 can extract the hash value corresponding to the user ID. Of course, if the user ID is not registered, the server 120 can generate a guidance message corresponding to an unregistered user ID and transmit it to the client terminal 110.

In step 415, the server 120 may generate a random value for generating the one-time server certification message. Here, the random value may be generated randomly at the server 120 every time a user authentication is performed. Accordingly, the one-time server certification message transmitted from the server 120 to the client terminal 110 may be different every time.

Although it is assumed in FIG. 4 that the random value is generated after the hash value corresponding to the user ID is extracted, it is to be appreciated that step 415 can be performed before step 410.

In step 420, the server 120 may generate a verification seed value by performing an exclusive disjunction operation on the random value and the hash value.

Then, in step 425, the server 120 may calculate a second-order hash value by applying a unidirectional hash function to at least one of the hash value, random value, and IP information. Here, the IP information can be the IP address of the server 120.

In the present specification, the second-order hash value refers to a resultant value of applying a unidirectional hash function again to a hash value that was already obtained by applying a unidirectional hash function.

In step 430, the server 120 may perform an exclusive disjunction operation on the calculated second-order hash value and the hash value to derive a resultant value.

In step 435, the server 120 may adjoin the verification seed value with the resultant value to create the one-time server certification message.

In the one-time server certification message, the verification seed value may differ every time due to the change in the random value, and as a result, the one-time server certification message can be generated differently for every occurrence of authentication.

Returning again to FIG. 3, in step 320, the server 120 may transmit the generated one-time server certification message to the client terminal 110.

In step 325, the client terminal 110 may verify the one-time server certification message received from the server 120.

For the sake of easier understanding, the method of verifying the one-time server certification message at the client terminal 110 is described below in more detail with reference to FIG. 5.

As described above with reference to FIG. 4, the one-time server certification message may include a verification seed value and a resultant value.

Thus, in step 510, the client terminal 110 may extract the verification seed value from the one-time server certification message received from the server 120.

The verification seed value may be a resultant value generated by an exclusive disjunction operation performed on a random value and the hash value, as described above with reference to FIG. 4.

In step 515, the client terminal 110 may calculate a hash value by applying a unidirectional hash function to the password inputted beforehand and the domain name of the server 120.

In step 520, the client terminal 110 may extract the random value by performing an exclusive disjunction operation on the calculated hash value and the verification seed value.

In step 525, the client terminal 110 may calculate a second-order hash value by applying a unidirectional hash function to at least one of the extracted random value, the hash value, and the IP information included in the packet header of the one-time server certification message.

In step 530, the client terminal 110 may calculate a resultant value of performing an exclusive disjunction operation on the calculated second-order hash value and the hash value.

In step 535, the client terminal 110 may determine whether or not the calculated resultant value and the resultant value included in the one-time server certification message are identical.

If the calculated resultant value is the same as the resultant value extracted from the one-time server certification message, then in step 540, the client terminal 110 may recognize that the verification of the server is successful.

However, if the calculated resultant value is not the same as the resultant value extracted from the one-time server certification message, then in step 545, the client terminal 110 can recognize that the verification of the server has failed.

In step 330, the client terminal 110 may determine whether or not the server verification is successful.

If the server verification has failed, then in step 335, the client terminal 110 can show a guidance message corresponding to the server verification failure and then terminate the connection process to the server 120.

However, if the server verification has succeeded, then in step 340, the client terminal 110 may use a random value and a hash value to generate a one-time terminal certification message.

For example, the client terminal 110 can generate the one-time terminal certification message by performing an exclusive disjunction operation on the hash value and the second-order hash value calculated by using the random value and the hash value.

As described above, it is to be appreciated that, during the calculation of the second-order hash value, the unidirectional hash function can further utilize the IP information of the client terminal 110 as a seed value in addition to the random value and the hash value.

In step 345, the client terminal 110 may transmit the one-time terminal certification message to the server 120.

In step 350, the server 120 may verify the terminal by using the one-time terminal certification message received from the client terminal 110.

For example, when a one-time terminal certification message is received from a client terminal 110, the server 120 can calculate the second-order hash value by applying a unidirectional hash function to at least one of the hash value, the random value, and the IP information of the source of the packet header. Then, the server 120 may perform an exclusive disjunction operation on the calculated second-order hash value and the hash value to derive a resultant value. The server 120 may compare the derived resultant value with the resultant value included in the one-time terminal certification message to determine whether or not they are identical.

If the calculated resultant value and the resultant value included in the one-time terminal certification message are the same, then the server 120 can recognize that the verification of the terminal is successful. However, if the calculated resultant value and the resultant value included in the one-time terminal certification message are different, then the server 120 can recognize that the verification of the terminal has failed.

In step 355, the server 120 may determine whether or not the verification of the terminal is successful.

If the verification of the terminal has failed, then in step 360, the server 120 can block the access by the client terminal 110 according to the verification failure. Here, the server 120 can also transmit a guidance message relating to the verification failure to the client terminal 110.

However, if the verification of the terminal is successful, then in step 365, the server 120 can provide a guidance message corresponding to a successful terminal verification to the client terminal 110 and provide the service requested by the client terminal 110.

With a user authentication method according to an embodiment of the invention, even if the user ID is exposed to the outside, the password corresponding to the user ID is not directly transmitted between the client terminal and the server when authenticating a user, as described above with reference to FIG. 3 to FIG. 5. This can prevent exposure of the entire user account even in the event of a malignant phishing or pharming attack.

Figure 6:
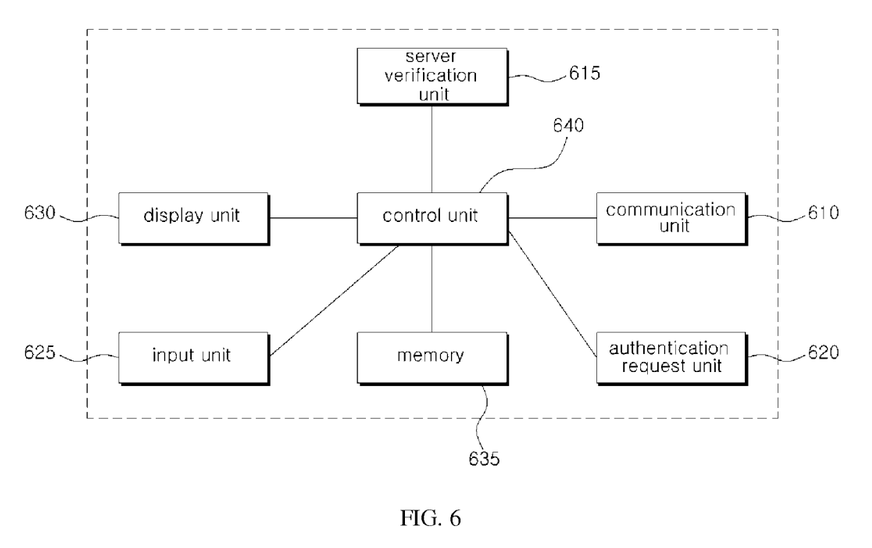
FIG. 6 is a block diagram schematically illustrating the internal composition of a client terminal according to an embodiment of the invention.

FIG. 6 is a block diagram schematically illustrating the internal composition of a client terminal according to an embodiment of the invention.

Referring to FIG. 6, a client terminal 110 according to an embodiment of the invention may include a communication unit 610, a server verification unit 615, an authentication request unit 620, an input unit 625, a display unit 630, a memory 635, and a control unit 640.

The communication unit 610 may be a device for transmitting and receiving data over a communication network to and from another apparatus (e.g. the server 120).

For example, the communication unit 610 can transmit a user ID or a one-time terminal certification message according to the control of the control unit 640. Also, the communication unit 610 can receive a one-time server certification message from the server 120 and output it to the server verification unit 615.

The server verification unit 615 may be a device for verifying the server by using the one-time server certification message received through the communication unit 610.

As already described above, the one-time server certification message may include a verification seed value and a second-order hash value. The verification seed value may include a random value and a hash value, where the hash value may be a resultant value of applying a unidirectional hash function to a password and a domain name.

Accordingly, the server verification unit 615 can calculate the hash value by applying a unidirectional hash function to a pre-configured (or pre-inputted) password and a domain name. Then, the server verification unit 615 can extract the random value by performing an exclusive disjunction operation on the calculated hash value and the verification seed value.

After extracting the random value, the server verification unit 615 can calculate the second-order hash value by applying a unidirectional hash function to the IP information included in the packet header of the one-time server certification message (i.e. the IP information of the server 120) and the random value and hash value. The server verification unit 615 can derive a resultant value of performing an exclusive disjunction operation on the calculated second-order hash value and the hash value. Then, the server verification unit 615 can verify the server 120 according to whether or not the resultant value thus derived is the same as the resultant value included in the one-time server certification message. That is, the server verification unit 615 can recognize the server verification as being successful if the calculated resultant value and the resultant value included in the one-time server certification message are identical and recognize the server verification as having failed if the calculated resultant value and the resultant value included in the one-time server certification message are different.

The authentication request unit 620 may be a device for requesting user authentication by generating a one-time terminal certification message for terminal verification if the server verification by the server verification unit 615 is successful.

For example, the authentication request unit 620 may generate a second-order hash value by applying a unidirectional hash function to at least one of the random value extracted by the server verification unit 615, the IP information of the client terminal, and the hash value. Then, the authentication request unit 620 can provide the control for calculating the resultant value of performing an exclusive disjunction operation on the hash value and the second-order hash value, and then generating a one-time terminal certification message that includes the resultant value and transmitting it to the server 120.

The input unit 625 may be a device for receiving various control commands for controlling the client terminal 110 and various information (e.g. the user ID, password, etc.) as input from the user. For example, the input unit 625 can be implemented as at least one key button.

The display unit 630 may be a device for showing various data in the form of visual information. For example, the display unit 630 can be a liquid crystal display screen.

The memory 635 may store various algorithms required for operating a client terminal 110 according to an embodiment of the invention, the hash function, various data derived during a user authentication process, and the like.

The control unit 640 may be a device for controlling the internal components of a client terminal 110 according to an embodiment of the invention (e.g. the communication unit 610, server verification unit 615, authentication request unit 620, input unit 625, display unit 630, memory 635, etc.).

Figure 7:
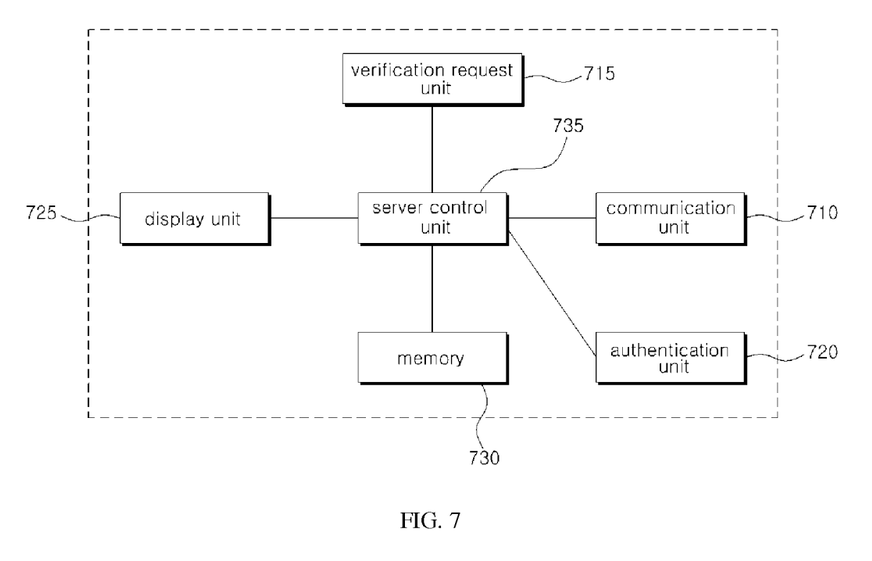
FIG. 7 is a block diagram schematically illustrating the composition of a server according to an embodiment of the invention.

FIG. 7 is a block diagram schematically illustrating the composition of a server according to an embodiment of the invention.

Referring to FIG. 7, a server 120 according to an embodiment of the invention may include a communication unit 710, a verification request unit 715, an authentication unit 720, a display unit 725, a memory 730, and a server control unit 735.

The communication unit 710 may be a device for transmitting and receiving data over a communication network to and from another apparatus (e.g. the client terminal 110).

For example, the communication unit 710 can receive a user ID from the client terminal 110 or transmit a one-time server certification message to the client terminal 110 according to the control of the server control unit 735.

The verification request unit 715 may be a device for requesting server verification by generating a one-time server certification message by using a hash value corresponding to the user ID received from the client terminal 110.

For example, the verification request unit 715 may generate a random value for user authentication and may extract a hash value corresponding to the user ID. Then, the verification request unit 715 may calculate a second-order hash value by applying a unidirectional hash function to at least one of the random value, hash value, and IP information of the server. Then, the verification request unit 715 may generate a resultant value of performing an exclusive disjunction operation on the second-order hash value and the hash value.

Next, the verification request unit 715 can generate a one-time server certification message by adjoining the resultant value and the verification seed value and transmit it to the client terminal 110.

The authentication unit 720 may be a device for authenticating a user by verifying the one-time terminal certification message received through the communication unit 710.

As already described above, the one-time terminal certification message may include a resultant value. Here, the resultant value may be the resultant value of an exclusive disjunction operation on the hash value and a second-order hash value, which may be obtained by applying a unidirectional hash function to at least one of the hash value, the IP information of the client terminal, and the random value.

Accordingly, the authentication unit 720 may calculate the second-order hash value, which may be obtained by applying a unidirectional hash function to at least one of the hash value that was stored beforehand in correspondence to the user ID stored in the server 120, the IP information included in the packet header of the one-time terminal certification message, and the random value. Then, the authentication unit 720 can perform the exclusive disjunction operation on the calculated second-order hash value and the hash value to derive the resultant value.

Thus, the authentication unit 720 can authenticate a user by comparing whether or not the derived resultant value is the same as the resultant value included in the one-time terminal certification message. That is, the authentication unit 720 can recognize that the user authentication is successful if the derived resultant value and the resultant value included in the one-time terminal certification message are identical and can recognize that the user authentication has failed if the two resultant values are different.

The display unit 725 may be a device for showing various data in the form of visual information. For example, the display unit 725 can be a liquid crystal display screen.

The memory 730 may store various algorithms required for operating a server 120 according to an embodiment of the invention, the hash function, various data derived during a user authentication process, and the like.

The server control unit 735 may be a device for controlling the internal components of a server 120 according to an embodiment of the invention (e.g. the communication unit 710, verification request unit 715, authentication unit 720, display unit 725, memory 730, etc.).

A user authentication method according to an embodiment of the present invention can be implemented in the form of program instructions that may be performed using various computer means and can be recorded in a computer-readable medium. Such a computer-readable medium can include program instructions, data files, data structures, etc., alone or in combination.

The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a device for electronically processing information, such as a computer, through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A user authentication method for authenticating a user from a server, the user authentication method comprising:
   (a) transmitting a one-time server certification message in response to an authentication request including a user ID of a client terminal, and receiving a one-time terminal certification message from the client terminal; and
   (b) authenticating the user by verifying the one-time terminal certification message by using a hash value stored beforehand in correspondence to the user ID,
   wherein the authenticating of the user in said step (b) comprises:
   calculating a second-order hash value by applying a unidirectional hash function to at least one of a random value, the hash value, and IP information included in a packet header of the one-time terminal certification message;
   deriving a resultant value of applying an exclusive disjunction operation to the calculated second-order hash value and the hash value; and
   authenticating the user by determining whether or not the derived resultant value and a resultant value included in the one-time terminal certification message are identical.

2. The user authentication method of claim 1, wherein the hash value is a resultant value of applying a password and a domain name to a unidirectional hash function and is registered together with the user ID received from the client terminal at a time of registering an account.

3. The user authentication method of claim 1, wherein the one-time terminal certification message includes the resultant value of applying the exclusive disjunction operation to the second-order hash value and the hash value, the second-order hash value obtained by applying a hash function to at least one of the hash value, IP information of the client terminal, and the random value.

4. The user authentication method of claim 3, wherein the random value is extracted from the one-time server certification message and is randomly generated with every authentication.

5. The user authentication method of claim 1, wherein the transmitting of the one-time server certification message in said step (a) comprises:
   generating a random value;
   calculating a verification seed value by applying an exclusive disjunction operation to the hash value and the random value;
   calculating a second-order hash value by applying a unidirectional hash function to at least one of the hash value, the random value, and IP information;
   calculating a resultant value of applying an exclusive disjunction operation to the second-order hash value and the hash value;
   generating the one-time server certification message including the resultant value and the verification seed value; and
   transmitting the generated one-time server certification message to the client terminal.

6. The user authentication method of claim 1, further comprising, prior to said step (a):
   storing the user ID and the hash value in correspondence to each other in response to an account registration request of the client terminal.

7. A user authentication request method for a client terminal requesting user authentication to a server, the user authentication request method comprising:
   transmitting a user ID to the server;
   receiving a one-time server certification message from the server in response to transmitting the user ID; and
   generating a one-time terminal certification message for user authentication, if a verification of the server is successful, and transmitting the one-time terminal certification message to the server, the verification of the server performed by verifying the one-time server certification message by using a hash value using a password,
   wherein the generating of the one-time terminal certification message comprises:
   generating a second-order hash value by applying a unidirectional hash function to at least one of the random value, the hash value, and IP information of the client terminal;
   calculating a resultant value of performing an exclusive disjunction operation on the second-order hash value and the hash value; and
   generating the one-time terminal certification message to include the resultant value.

8. The user authentication request method of claim 7, wherein the hash value is a resultant value of applying a password and a domain name to a unidirectional hash function.

9. The user authentication request method of claim 7, wherein the one-time server certification message includes a verification seed value and a resultant value of applying an exclusive disjunction operation to a second-order hash value and the hash value, the second-order hash value obtained by applying a hash function to at least one of the hash value, IP information of the server, and a random value.

10. The user authentication request method of claim 7, wherein the verifying of the one-time server certification message comprises:
    extracting the verification seed value;
    extracting the random value by performing an exclusive disjunction operation on the hash value and the verification seed value;
    calculating a second-order hash value by applying a unidirectional hash function to the random value, IP information included in a packet header of the one-time server certification message, and the hash value, and performing an exclusive disjunction operation on the second-order hash value and the hash value to calculate a resultant value; and verifying the server according to whether or not the resultant value and a resultant value in the one-time server certification message are identical.

11. A server comprising:

a processor configured to:

transmit a one-time server certification message in response to an authentication request including a user ID of a client terminal and receive a one-time terminal certification message from the client terminal in reply to the transmission;

authenticate a user by verifying the one-time terminal certification message by using a hash value stored beforehand in correspondence to the user ID;

calculate a second-order hash value by applying a unidirectional hash function to at least one of a random value, the hash value, and IP information included in a packet header of the one-time terminal certification message;

derive a resultant value of applying an exclusive disjunction operation to the calculated second-order hash value and the hash value; and authenticate the user by determining whether or not the derived resultant value and a resultant value included in the one-time terminal certification message are identical.

12. A client terminal comprising:

a processor configured to:

receive a one-time server certification message in response to transmitting a user ID;

verify a server by verifying the one-time server certification message by using a hash value using a password;

generate a one-time terminal certification message for user authentication, if a verification of the server is successful, and to transmit the one-time terminal certification message to the server;

generate a second-order hash value by applying a unidirectional hash function to at least one of the random value, the hash value, and IP information of the client terminal;

calculate a resultant value of performing an exclusive disjunction operation on the second-order hash value and the hash value; and generate the one-time terminal certification message to include the resultant value.

* * * * *